(12) United States Patent
Lincoln et al.

(10) Patent No.: US 10,905,983 B1
(45) Date of Patent: Feb. 2, 2021

(54) FLOW-DIRECTING WATER FILTER HOUSING, WATER FILTER SYSTEM AND METHOD

(71) Applicant: ERD Paris, LLC, Atlanta, GA (US)

(72) Inventors: Danny F. Lincoln, Commerce, GA (US); Ehud Levy, Santa Rosa Beach, FL (US)

(73) Assignee: ERD Paris, LLC, Middletown, DE (US)

( * ) Notice: Subject to any disclaimer, the term of this patent is extended or adjusted under 35 U.S.C. 154(b) by 0 days.

(21) Appl. No.: 16/739,969

(22) Filed: Jan. 10, 2020

(51) Int. Cl.
| | | |
|---|---|---|
| *B01D 29/15* | (2006.01) | |
| *B01D 29/90* | (2006.01) | |
| *B01D 35/30* | (2006.01) | |
| *C02F 1/00* | (2006.01) | |
| *C02F 1/28* | (2006.01) | |

(52) U.S. Cl.
CPC .......... *B01D 29/902* (2013.01); *B01D 29/15* (2013.01); *B01D 35/30* (2013.01); *C02F 1/001* (2013.01); *C02F 1/283* (2013.01); *B01D 2201/291* (2013.01); *B01D 2201/302* (2013.01); *C02F 2201/006* (2013.01); *C02F 2301/022* (2013.01)

(58) Field of Classification Search
CPC ...... B01D 29/902; B01D 29/15; B01D 35/30; B01D 2201/291; B01D 2201/302; C02F 1/001; C02F 1/283; C02F 2201/006; C02F 2301/022
See application file for complete search history.

(56) References Cited

U.S. PATENT DOCUMENTS

| | | | |
|---|---|---|---|
| 4,839,037 A * | 6/1989 | Bertelsen | B01D 29/216 |
| | | | 156/187 |
| 5,096,721 A | 3/1992 | Levy | |
| 5,133,871 A | 7/1992 | Levy | |
| 5,192,571 A | 3/1993 | Levy | |
| 5,401,416 A | 3/1995 | Levy | |
| 5,538,746 A | 7/1996 | Levy | |
| 5,562,941 A | 10/1996 | Levy | |
| 5,612,522 A | 3/1997 | Levy | |
| 5,616,243 A | 4/1997 | Levy | |
| 6,103,120 A * | 8/2000 | Hopkins | B01D 29/23 |
| | | | 210/497.1 |
| 6,241,893 B1 | 6/2001 | Levy | |
| 7,229,552 B1 | 6/2007 | Levy | |
| 7,264,726 B1 | 9/2007 | Levy | |
| 7,357,868 B2 | 4/2008 | Levy | |
| 7,429,326 B2 | 9/2008 | Levy | |
| 7,673,756 B2 | 3/2010 | Levy et al. | |

(Continued)

*Primary Examiner* — Benjamin L Lebron
(74) *Attorney, Agent, or Firm* — Andrew M. Harris; Mitch Harris, Atty at Law

(57) ABSTRACT

A flow-directing water filtration system provides a flow of water through a cylindrical filter cartridge that is more uniform by inclusion of multiple water-directing ridges that form channels between them between the inner wall of the housing and an outside wall of the water filter cartridge for directing laminar flow of water along the outside wall of the water filter cartridge to improve distribution of water flow through the water filter cartridge along its length. The ridges may be formed on the inner wall of the housing, may have a half-circular profile and may be helical ridges that spiral along the extent of the cartridge and may taper in profile toward the bottom of the cartridge.

16 Claims, 13 Drawing Sheets

(56) References Cited

U.S. PATENT DOCUMENTS

| | | |
|---|---|---|
| 8,277,654 B2 | 10/2012 | Levy |
| 8,501,005 B2 | 8/2013 | Levy |
| 8,701,895 B2 | 4/2014 | Levy |
| 8,702,990 B2 | 4/2014 | Levy |
| 9,782,706 B1 | 10/2017 | Levy |
| 10,112,859 B2 | 10/2018 | Levy |
| 10,456,723 B2 | 10/2019 | Levy |
| 10,464,820 B2 | 11/2019 | Levy |
| 10,519,046 B2 | 12/2019 | Levy |
| 2007/0000833 A1* | 1/2007 | Levy .................... B01D 29/114 210/435 |
| 2018/0099878 A1 | 4/2018 | Levy |

* cited by examiner

US 10,905,983 B1

FLOW-DIRECTING WATER FILTER HOUSING, WATER FILTER SYSTEM AND METHOD

BACKGROUND OF THE INVENTION

1. Field of the Invention

The present invention relates generally to water filtration systems, and in particular, to a water filter system that incorporates spiral ridges to direct inlet water downward within the water filter housing.

2. Description of the Related Art

Water filtration is required in many industrial and residential applications to remove particles such as metals, organisms and organic molecules from available water sources. Multiple stages of filtration may be cascaded to improve filtration, typically filter a decreasing particle size as the water proceeds through the stages. Filter elements include replaceable paper, plastic and activated carbon cartridges elements, including cartridges that combine more than one type of element.

Typical water filter units receive an input water source and deliver the input water to the outside surface of a cylindrical cartridge. Output water is received from a central void in the cartridge, which retains particles as the water passes through the wall of the cartridge. However, due to the flow distribution of the input water originating above the top end of the cartridge, the amount of flow through the cartridge decreases toward the bottom of the cartridge, reducing filter lifetime, filtration efficiency and potential flow rate, because the bottom portion of the cartridge is not processing as much water as the top portion.

Therefore, it would be desirable to provide a water filtration system that has more uniform flow through a cylindrical cartridge.

SUMMARY OF THE INVENTION

The above objectives, among others, are achieved in a flow-directing water filter housing, a water filtration system and a method of filtering water.

The flow-directing water filtration system includes a housing a head having one or more inlets for receiving input water and one or more outlets for providing filtered output water, a cylindrical water filter cartridge with a central void for providing the filtered output water and an outer surface for receiving the input water, a water filter housing a housing body having an inner wall defining a substantially cylindrical void for receiving the water filter cartridge with a longitudinal axis of the water filter cartridge aligned with a central axis of the cylindrical void, a bottom wall supporting a bottom end of the water filter cartridge, and mounting features disposed at a top end of the water filter housing for mating with corresponding mating features of the head, and multiple water-directing ridges that form channels between adjacent ones of the water-directing ridges and between the inner wall of the housing and an outside wall of the water filter cartridge for directing laminar flow of water along the outside wall of the water filter cartridge to improve distribution of water flow through the water filter cartridge along the length of the water filter cartridge. The ridges may be formed on the inner wall of the housing and may have a half-circular profile.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

The present disclosure illustrates water filtration systems that have improved cartridge lifetime, filtration efficiency and increased potential flow rate. The housing containing the filter cartridge has flow-directing ridges along the inside surface disposed around the cartridge that spiral around the cartridge to direct laminar flow in channels formed between the ridges, the housing and the cartridge, so that flow does not "short-circuit" at the top of the cartridge. By increasing the amount of flow through the bottom portion of the cartridge, the cartridge lifetime is more effectively utilized and flow rate can be improved over the lifetime of the filter by preventing premature clogging by water impurities. The filtration system is especially effective with activated carbon block filters, which have a higher filtration efficiency than same-sized granular cartridges, but are also more susceptible to clogging and resulting reduced flow rate/increased pressure head. The illustrated example is a molded plastic assembly, although the invention is not limited as to materials or techniques of fabrication. Further, while the specific embodiments disclosed herein are applicable to cartridge-type water filtration systems, the present invention may be used in other types of liquid filtration systems, as the same advantages apply with respect to directing flow across the surface of the filter element surface.

Figure 1A:
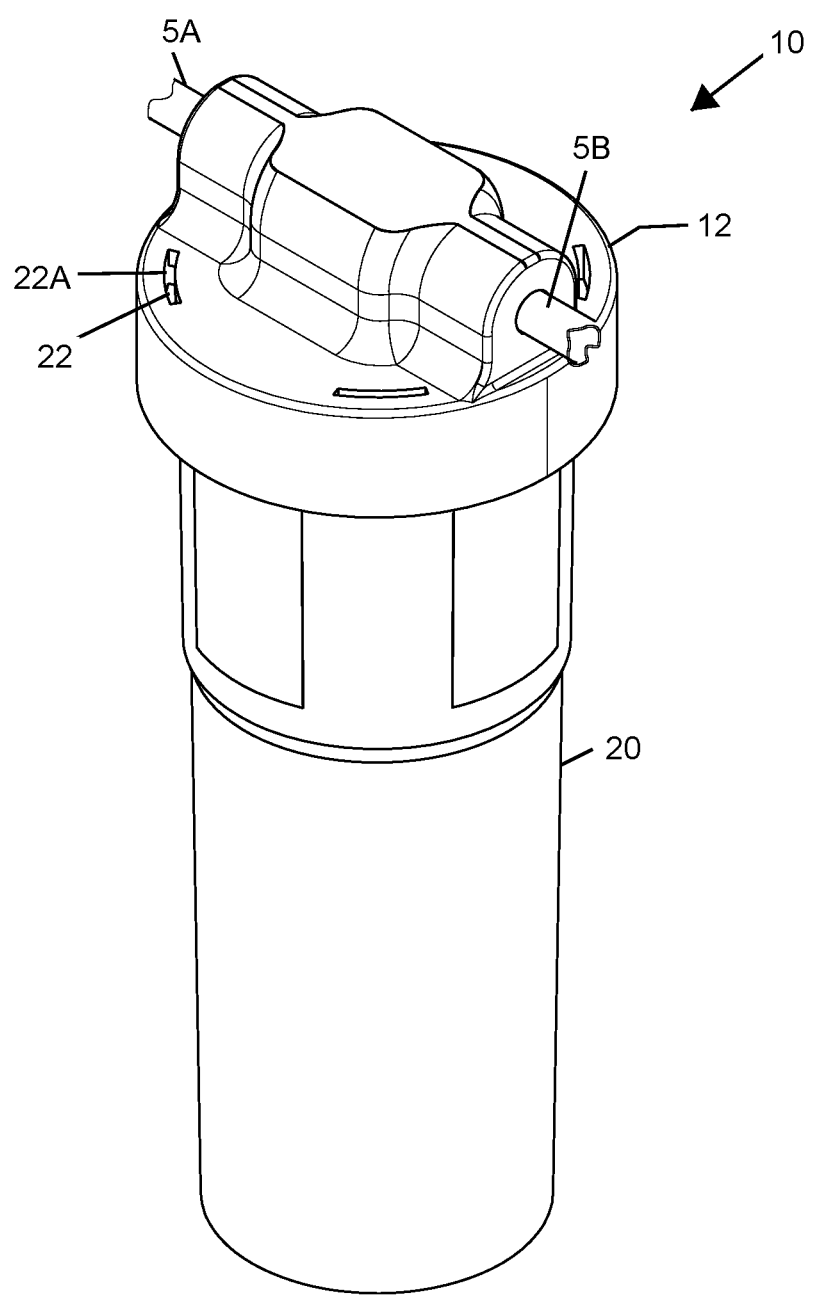
FIG. 1A is a perspective view and FIG. 1B is an exploded view of an example water filtration system 10 having a flow-directing water filter housing 20.

Referring now to FIG. 1A, a perspective view of an example water filtration system 10 is shown. Example water filtration system includes a flow-directing water filter housing 20 as will be described in further detail below, and which is attached to a water filtration system head 12 that provides a water inlet 5A, a water outlet 5B, by mating features 22A and 22 disposed on water filtration system head 12 and flow-directing water filter housing 20, respectively.

Figure 1B:
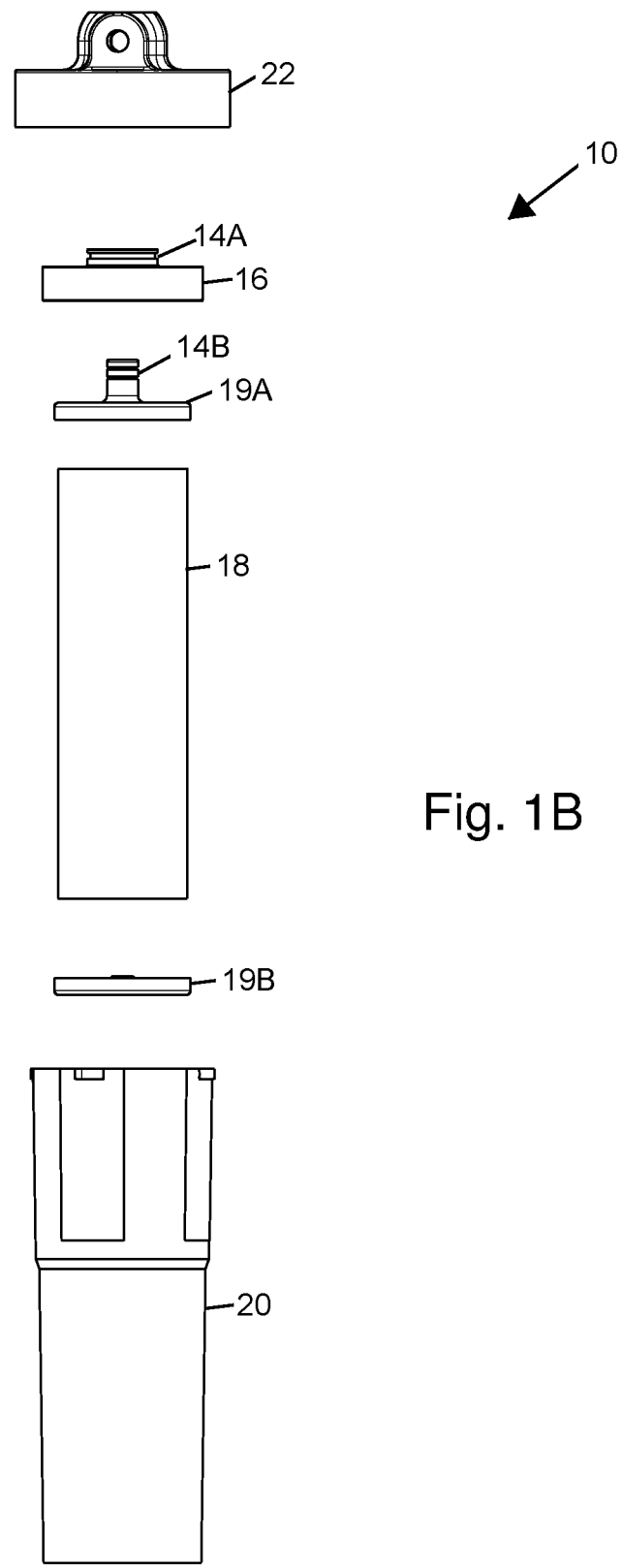

Referring now to FIG. 1B, an exploded view of example water filtration system 10 is shown. Input water is introduced to a cartridge 18 through water filtration system head 12 and through a fitting 14A of a cap 16 that acts as a top spacer disc. Fitting 14A engages with an outlet of water filtration system head 12 to receive input water from water inlet 5A. Spacer disc also retains the top end of cartridge 18 in proper position by a plurality of posts (not shown) that press against a top surface of a top flange 19A of cartridge 18. Top flange 19A includes an outlet fitting 14B that returns water from a central cylindrical void of cartridge 18 after the water has passed from the outer surface of cartridge 18 to the cylindrical void. Cartridge 18 also includes a bottom flange 19B having a recess that seats on a post at the bottom of flow-directing water filter housing 20. Mating features 22 of flow-directing water filter housing 20 are, in the illustrated example, tabs formed on the exterior upper edge of flow-directing water filter housing 20, but it is understood that the techniques of the present invention are applicable to any type of water filter housing retention, including threaded housing connections, as well as those that use external circumferential clamps and flanges.

Figure 2A:
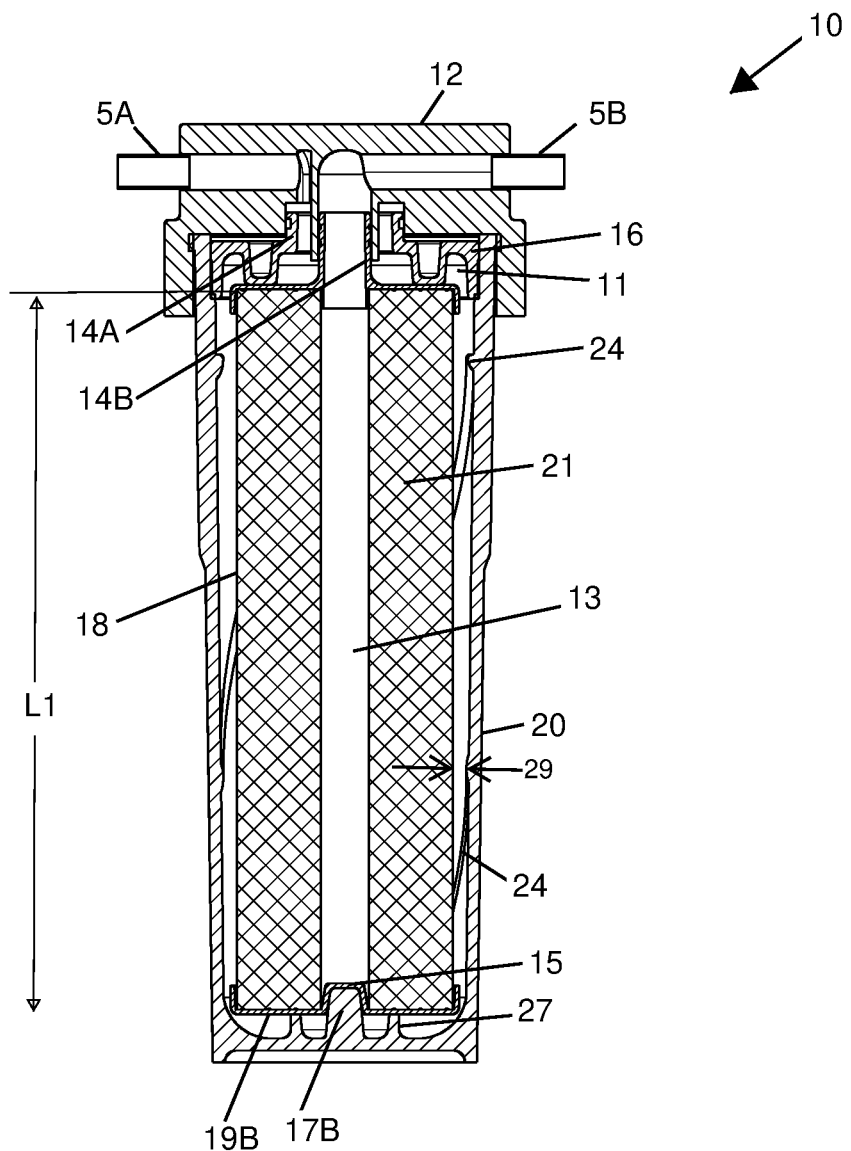
FIG. 2A is a side cross-section view of example water filtration system 10.

Referring now to FIG. 2A, a side cross-section view of example water filtration system 10 is shown. Input water is introduced through water inlet 5A and is conducted to a central void of fitting 14A to a volume underneath cap 16, which is held above top flange 19A of cartridge 18, the body of which is an activated carbon block 21, by a plurality of posts 17A as mentioned above. The water flow from underneath cap 16 is directed through a channel 11 that extends around the entire circumference of top flange 19A of cartridge 18 without disturbance, in contrast to prior designs in which the cap extends around the sides of the active surface of cartridge 18, cap 16 terminates above activated carbon block 21. A plurality of ridges 24, which in the illustrated embodiment have a half-circular cross-section profile, spiral around the inner surface of flow-directing water filter housing 20 in a helical pattern, forming channels that direct laminar flow around the outer surface of cartridge 18, increasing the effective surface area of activated carbon block 21 over that in water filtration system designs that lack ridges 24. The length of cartridge 18 is 15 inches in the example embodiment, which, since cartridge 18 incorporates an activated carbon block 21, represents the full usable length of cartridge 18. Flow-directing water filter housing 20 has a length 2 inches greater than length L1 of cartridge 18, so that the length of flow-directing water filter housing 20 is 17 inches in the example embodiment. Length L1 dictates a performance of cartridge 18, which can be assumed to relate linearly to cartridge length, however, the flow rate/filtering efficiency of cartridge 18 can be adjusted by increasing or decreasing a diameter of central cylindrical void 13, with an increasing diameter increasing the maximum flow rate for a given inlet water pressure. The profile of ridges 24 decreases in radius as ridges 24 spiral around cartridge 18, and thus the gap 29 between ridges 24 and the outer wall of cartridge 18 increases, until ridges 24 are terminated at a distance above the bottom of cartridge 18, or otherwise when their profile reduces to an insubstantial size. Ridges 24 form parallel helical patterns around the inner surface of flow-directing water filter housing 20 that have a pitch of one-fourth of the circumference of a top of the inner surface of flow-directing water filter housing 20, so that the bottom end of ridges 24 is approximately one-quarter turn from their origin at the top of flow-directing water filter housing 20. In the illustrated example, ridges extend slightly (about 20%) more than one-quarter turn. The initial radius/thickness of ridges 24 is approximately half of the distance between the outer edges of flanges 19A, 19B and the inner wall of flow-directing water filter housing 20. The inner volume of flow-directing water filter housing 20 is substantially cylindrical, but in the illustrated example taper in circumference toward the bottom of flow-directing water filter housing 20 by a factor of 1% and 5%. Bottom flange 19B of cartridge 18 has a recess 15, as mentioned above, that mates with a post 17B formed at the bottom of inner surface of flow-directing water filter housing 20. A stabilizing ring 27 formed around post 17B stabilizes cartridge 18 within flow-directing water filter housing 20 at the bottom of flow-directing water filter housing 20, and together with posts 17A, 17B secures cartridge 18 in place when flow-directing water filter housing 20 is secured to water filtration system head 12. Output water is provided to water outlet 5B from a central cylindrical void 13 of carbon block 21 through fitting 14B. O-rings are provided in channels around fittings 14A and 14B to seal against leakage between the unfiltered and filtered water volumes inside water filtration system 10.

Figure 2B:
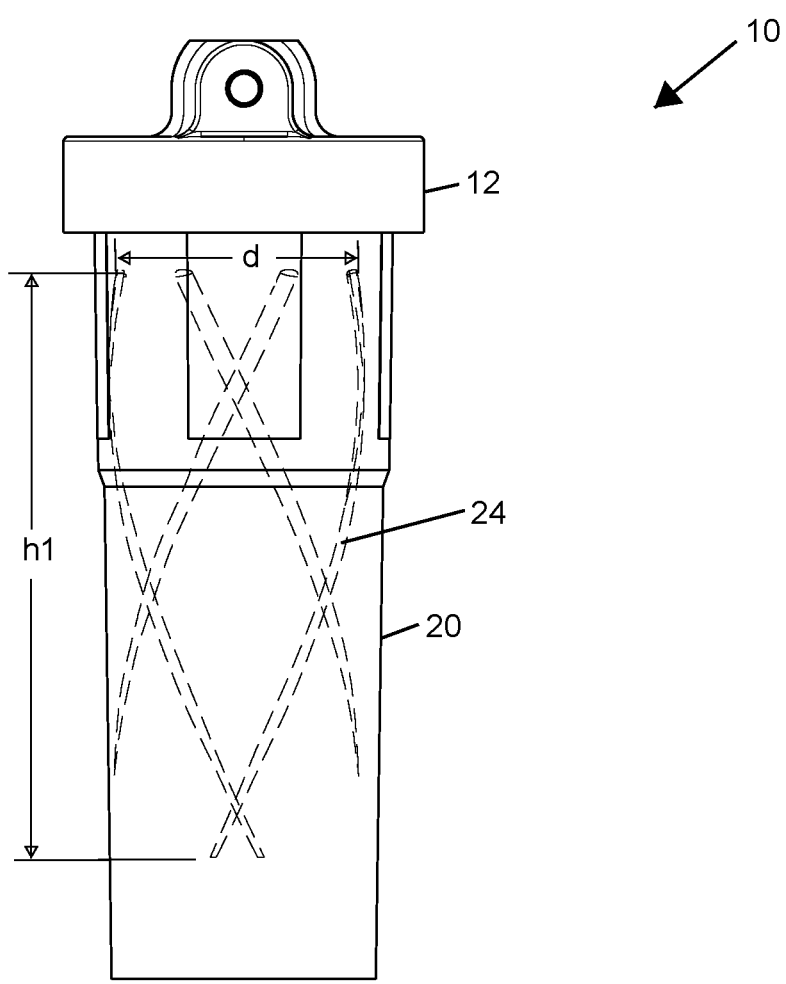
FIG. 2B is a side view showing inner details of flow-directing water filter housing 20 in example water filtration system 10.

Referring now to FIG. 2B, the profiles of ridges 24 are illustrated as dashed (hidden) lines on the inner surface of flow-directing water filter housing 20, in which the taper in profile and extension to near the bottom of flow-directing water filter housing 20 can be seen. A vertical extent h1 of ridges 24 is 13.5 inches or 90% of length L1 of cartridge 18 in the example embodiment. However, the amount of vertical extent h1 is not a limitation of the invention, and a vertical extent of ridges 24 in a range between 80%-100% of the cartridge length can be expected to yield adequate performance.

Figure 2C:
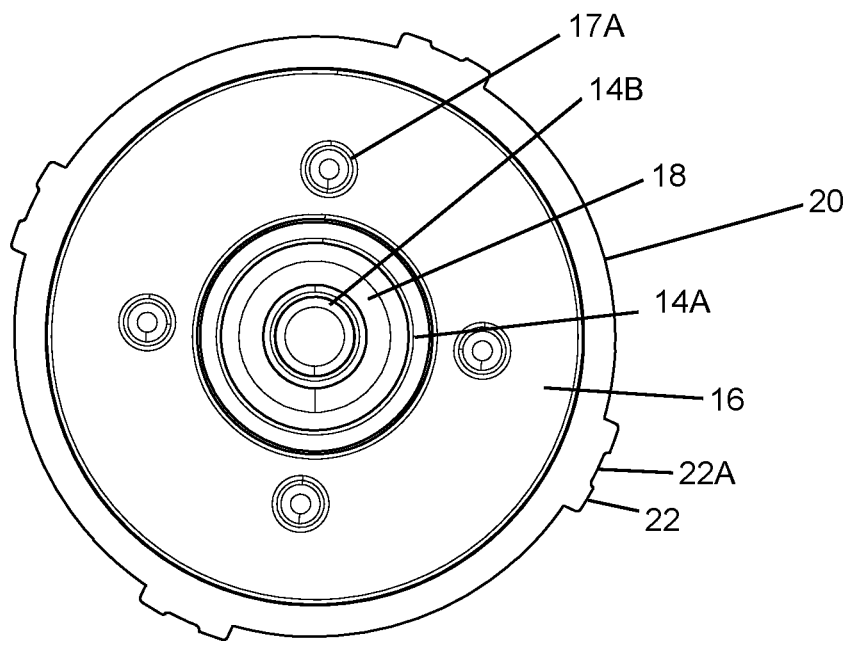
FIG. 2C is a top view of flow-directing water filter housing 20 with a filter cartridge 18 inserted.
Figure 2D:
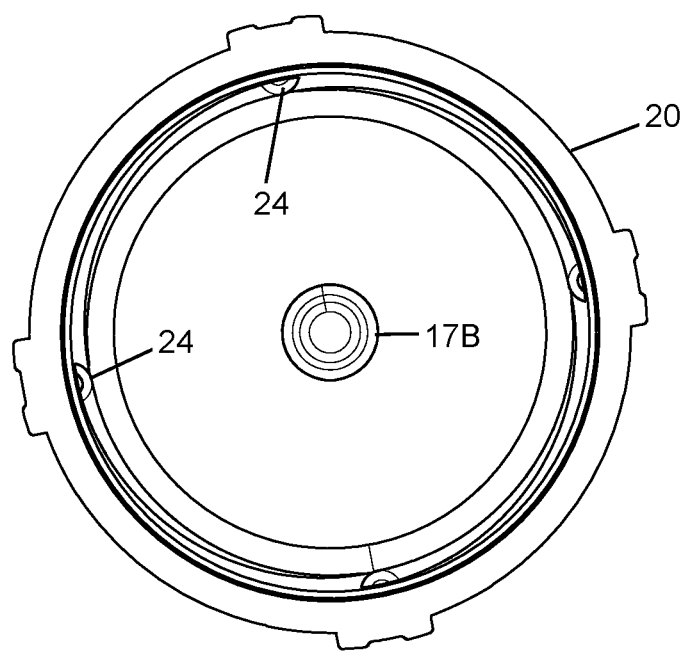
FIG. 2D is a top view of flow-directing water filter housing 20 with filter cartridge 18 removed.

Referring now to FIG. 2C and FIG. 2D, a top view of flow-directing water filter housing 20 is shown with cartridge 18 and cap 16 installed and removed, respectively. Referring to FIG. 2C, a central circular void through cap 16 and fitting 14A is shown that permits fitting 14A to protrude therethrough to conduct the output water to water filtration system head 12. A position of posts 17A are also shown, disposed around fitting 14A which receives the input water from water filtration system head 12 and directs the input water around fitting 14B to channel 11 (not shown). FIG. 2D shows the top ends of ridges 24 as well as their extension around the inner wall of flow-directing water filter housing 20. The position of post 17B is also visible. Mating features 22 are shown, which are protrusions extending from the outer circumference of the top end of flow-directing water filter housing 20 and including a notch 22A that registers with a bump provided in housing 20 to secure flow-directing water filter housing 20 against rotation with respect to water filtration system head once flow-directing water filter housing 20 is installed.

Figure 2E:
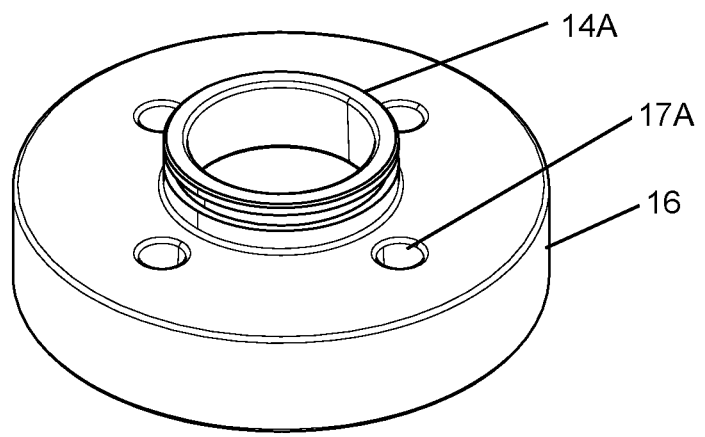
FIG. 2E is a top left perspective view and FIG. 2F is a bottom left perspective view of cap 16.
Figure 2F:
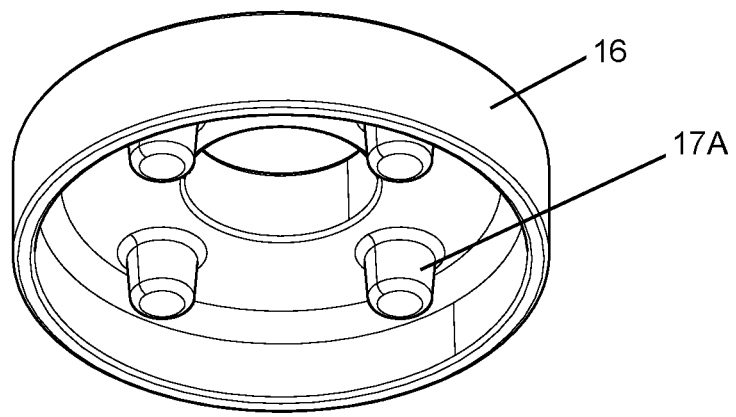

Referring now to FIG. 2E and FIG. 2F, a top left perspective view and a bottom left perspective view of cap 16 are shown, respectively. Posts 17A are formed as hollow depression, providing engagement locations for a spin welder that can be used to install cap 16 at the top of flow-directing water filter housing 20. Posts 17A extend from a bottom surface of cap 16 to provide pressure on the top of cartridge 18 to secure cartridge 18 in-place, as described above.

Figure 3A:
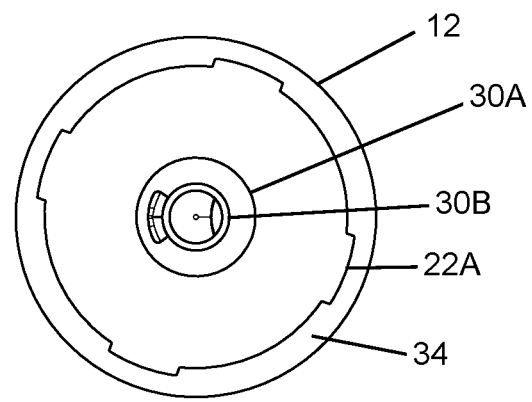
FIG. 3A is a bottom view and FIG. 3B is a top cross-section view of water filter system head 12 of example water filtration system 10.
Figure 3B:
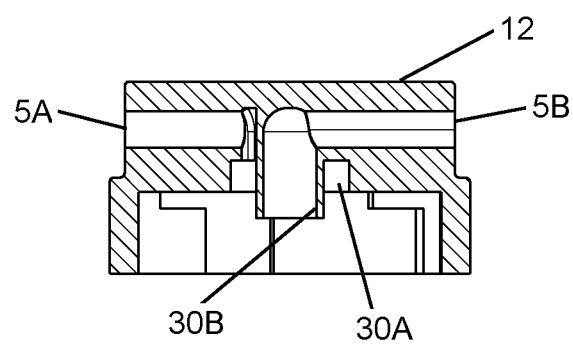
Figure 4A:
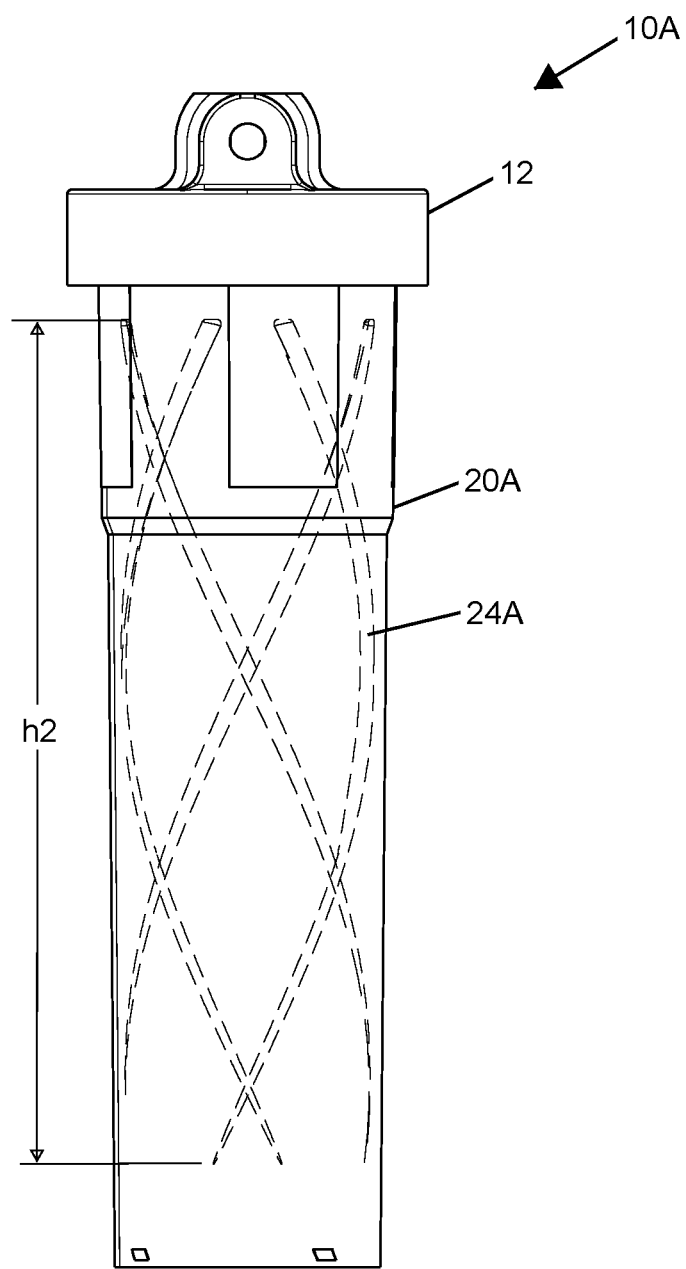
FIG. 4A is a side view showing inner details of flow-directing water filter housing 20A in another example water filtration system 10A.
Figure 4B:
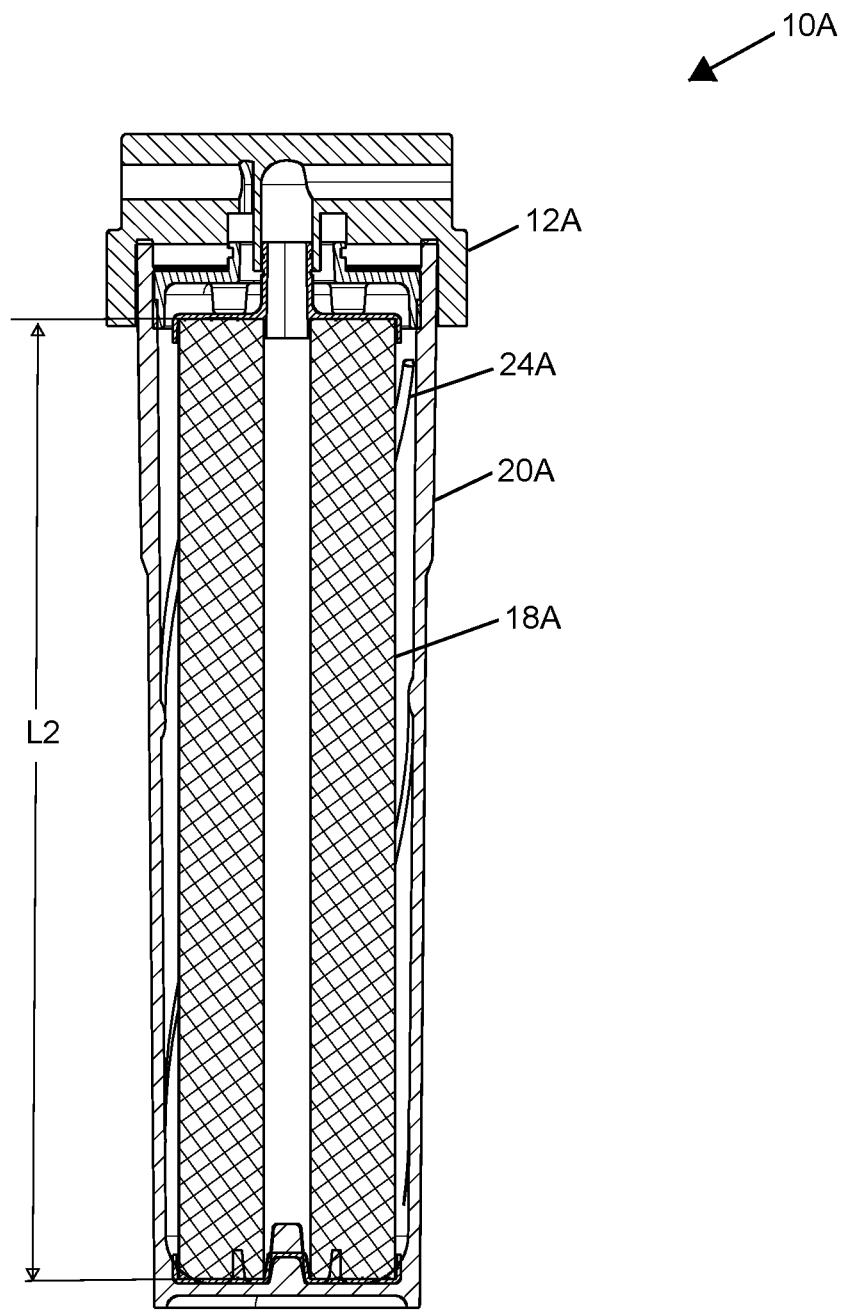
FIG. 4B is a side cross-section view of other example water filtration system 10A.
Figure 4C:
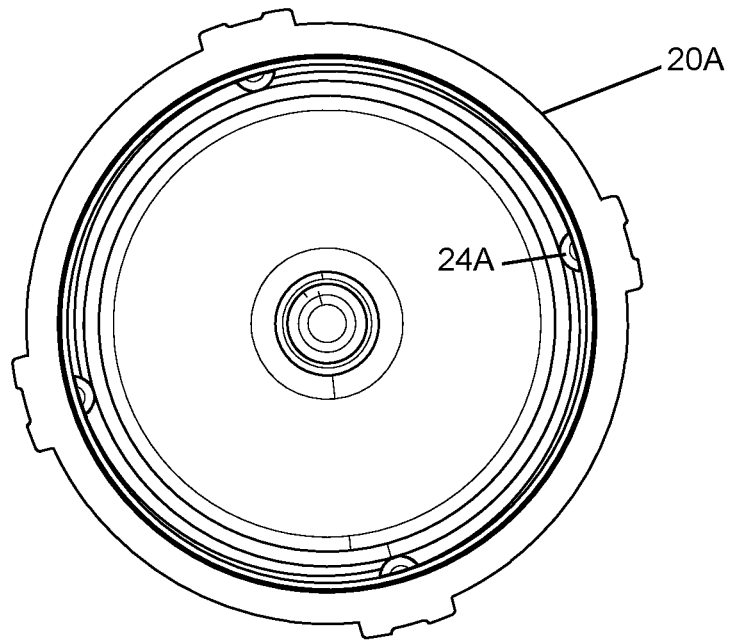
FIG. 4C is a top view of flow-directing water filter housing 20A with a filter cartridge 18A inserted.
Figure 4D:
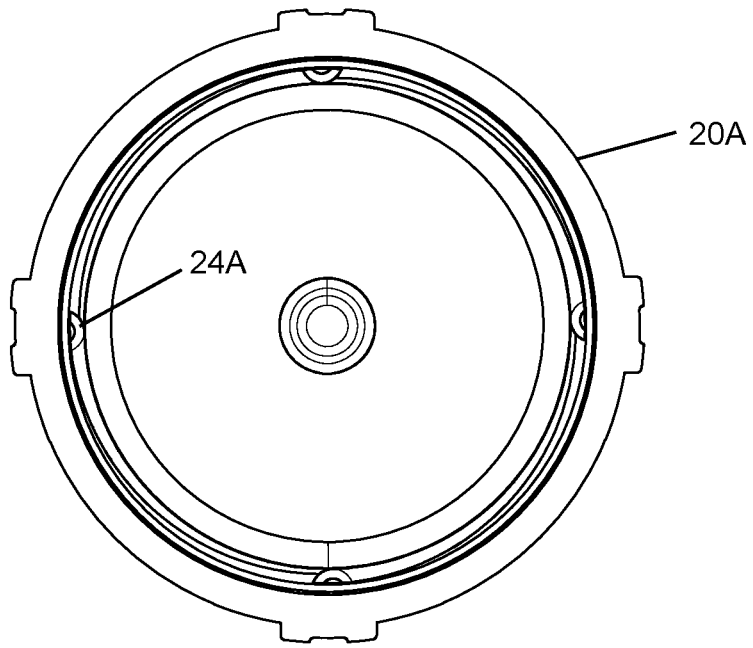
FIG. 4D is a top view of flow-directing water filter housing 20A with filter cartridge 18A removed.
Figure 5A:
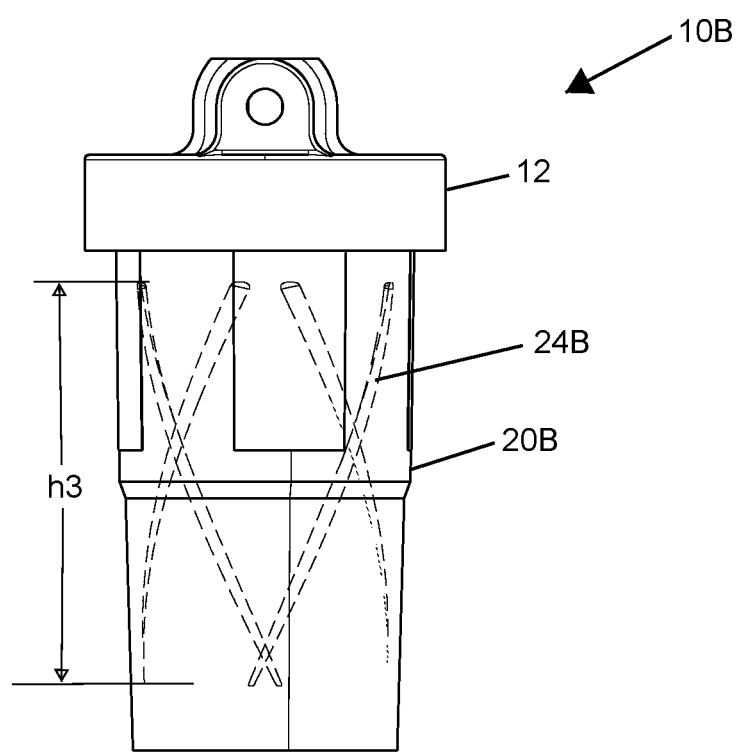
FIG. 5A is a side view showing inner details of flow-directing water filter housing 20B in another example water filtration system 10B.
Figure 5B:
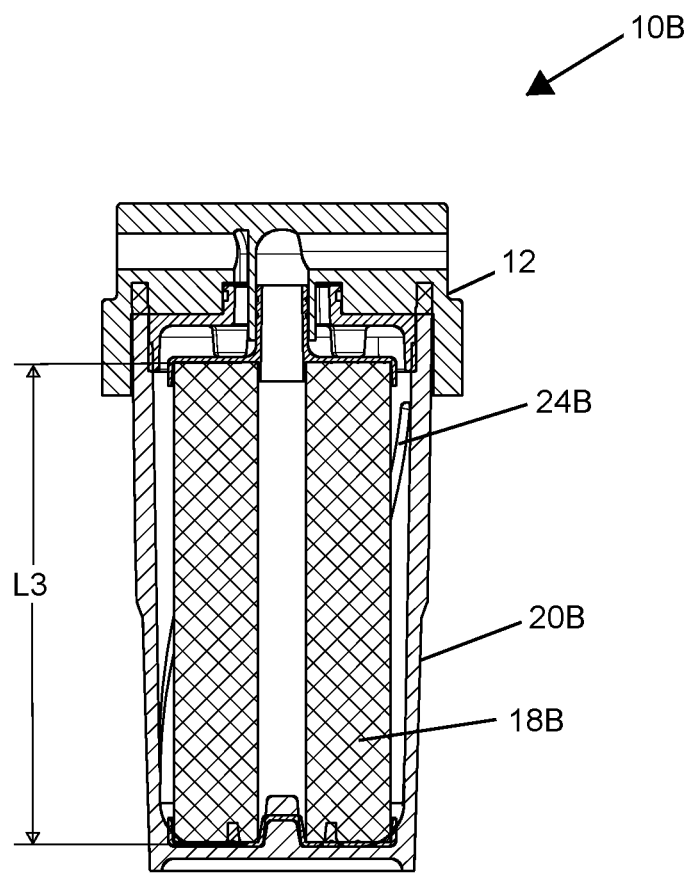
FIG. 5B is a side cross-section view of other example water filtration system 10B.
Figure 5C:
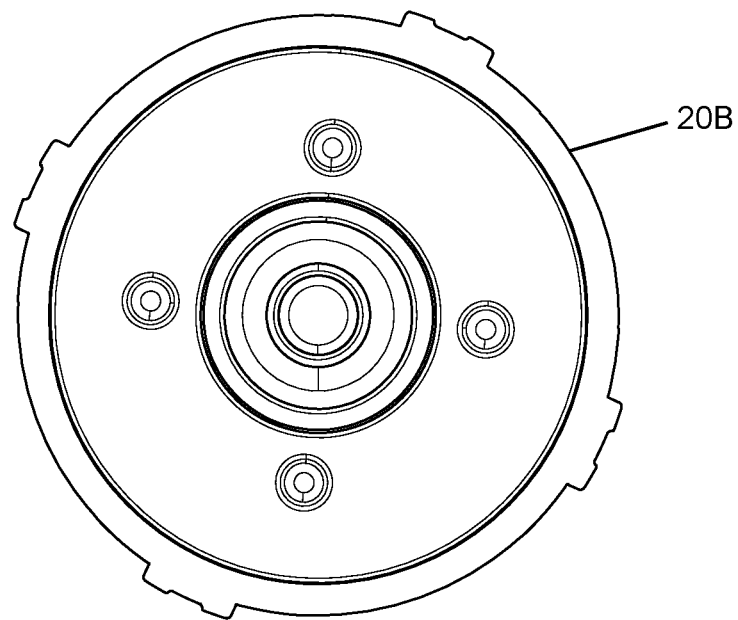
FIG. 5C is a top view of flow-directing water filter housing 20B with a filter cartridge 18B inserted.
Figure 5D:
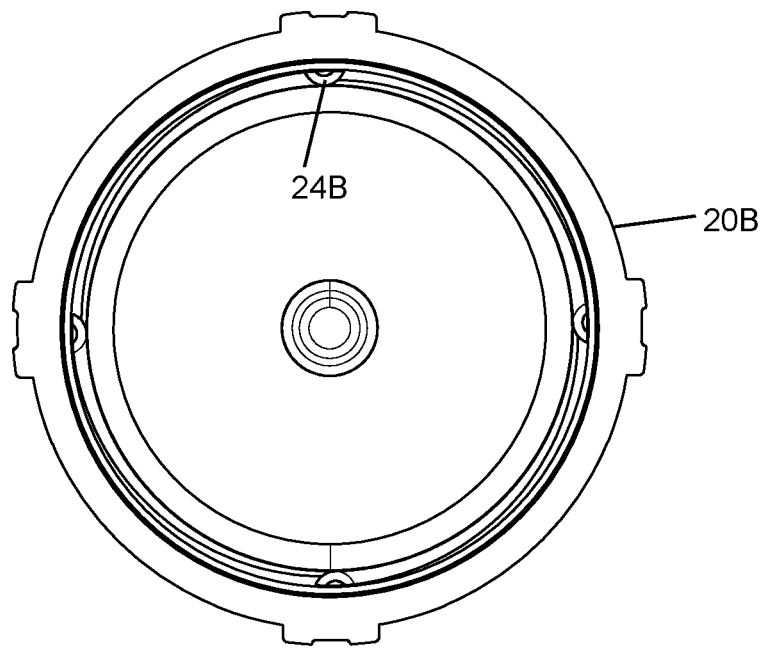
FIG. 5D is a top view of flow-directing water filter housing 20B with filter cartridge 18B removed.

Referring now to FIG. 3A and FIG. 3B, details of water filtration system head 12 are shown in a bottom view and a cross-section view, respectively. Water filtration system head 12 includes water inlet 5A, water outlet 5B, a fitting 30A in fluid communication with water inlet 5A that connects with fitting 14A of cap 16 as shown in FIG. 2A, and a fitting 30B in fluid communication with water outlet 5B that connects with fitting 14B of cartridge 18 as shown in FIG. 2A. Notches 22A provide mating features that interlock with tabs 22 of flow-directing water filter housing 20, when the top edge flow-directing water filter housing 20 is inserted into water filtration system head 12 and rotated to lock tabs 22 above a flange 34 at the lower edge of water filtration system head 12.

Referring now to FIGS. 4A-4D, a water filtration system 10A in accordance with another example is shown. Water filtration system 10A differs from water filtration system 10 as described above in that a cartridge 18A of water filtration system 10A has a length L2 of 20 inches, rather than the 15-inch cartridge length of cartridge 18 of water filtration system 10. Therefore, ridges 24A that are included on the inner surface of a flow-directing water filter housing 20A of water filtration system 10A have longer extensions than ridges 24 on the inner surface of flow-directing water filter housing 20 of water filtration system 10. In the illustrated example, the vertical extension of ridges is 17.8 inches or 89% of length L2 of cartridge 18A.

Referring now to FIGS. 5A-5D, a water filtration system 10B in accordance with another example is shown. Water filtration system 10B differs from water filtration system 10 as described above in that a cartridge 18B of water filtration system 10B has a height of 10 inches, rather than the 15-inch cartridge height of cartridge 18 of water filtration system 10. Therefore, ridges 24B that are included on the inner surface of a flow-directing water filter housing 20B of water filtration system 10B have shorter extensions than ridges 24 on the inner surface of flow-directing water filter housing 20 of water filtration system 10. In the illustrated example, the vertical extension of ridges is 10.3 inches or 86% of length L3 of cartridge 18B.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A flow-directing water filter system comprising:
  a water filter cartridge formed from a porous activated carbon cylinder defining an internal cylindrical void;
  a water filtration system head having at least one inlet for receiving inlet water and at least one outlet for providing an exit for exit water filtered by the water filter cartridge from the internal cylindrical void of the water filter cartridge;
  a housing body having an inner wall defining a substantially cylindrical void for receiving the water filter cartridge, so that the water filter cartridge has a longitudinal axis aligned with the central axis of the substantially cylindrical void of the housing body, a bottom wall supporting a bottom end of the water filter cartridge, and mounting features disposed at a top end thereof for mating corresponding mating features of the water filtration system head; and
  a plurality of helical water-directing ridges formed on an inner wall of the housing body that form channels between adjacent ones of the water-directing ridges and between the inner wall of the housing and an outer surface of the water filter cartridge for directing laminar circulating flow of the inlet water around and downward along the outer surface of the water filter cartridge to improve distribution of water flow through the water filter cartridge along the length of the water filter cartridge and to circulate the inlet water around the water filter cartridge to increase the effective surface area of the outer surface of the water filter cartridge.

2. The flow-directing water filter system of claim 1, wherein the initial thickness of the water-directing ridges is less than or equal to half of a distance between the outer surface of the water filter cartridge and the inner wall of housing body.

3. The flow-directing water filter housing of claim 1, wherein cross-sectional profiles of the plurality of water-directing ridges extending in plane normal to the longitudinal axis of the water filter cartridge is half-circular, with a base of the half-circular cross-sectional profiles abutting the inner wall of the housing body, and wherein the cross-sectional profiles decrease in area as the water-directing ridges extend around the inner wall of the housing body toward the bottom wall of the housing body, so that a length of a gap between the outer surface of the water filter cartridge and the plurality of water-directing ridges increases as the water-directing ridges extend around the inner wall of the housing body toward the bottom wall of the housing body.

4. The flow-directing water filter housing of claim 1, further comprising a top disc inserted into the housing body above a top end of the water filter cartridge, wherein the top disc defines a central void for providing clearance for an outlet water fitting of the water filter cartridge that passes through the void to connect to an outlet water fitting of the water filter system head and for passing inlet water uniformly around the outlet water fitting of the water filter cartridge, wherein the top disc includes a plurality of posts for maintaining a distance between the top disc and a top of the water filter cartridge to pass the inlet water to the outside surface of the water filter cartridge, and wherein the top disc does not extend over an active surface of the cartridge.

5. The flow-directing water filter system of claim 4, wherein the plurality of posts are aligned with top ends of corresponding ones of the ridges around the central axis of the substantially cylindrical void.

6. The flow-directing water filter system of claim 5, wherein the plurality of ridges consists of four ridges and the plurality of posts consists of a corresponding four posts.

7. The flow-directing water filter system of claim 1, wherein a cross-sectional profile of the plurality of water-directing ridges extending in plane normal to the longitudinal axis of the water filter cartridge is half-circular and wherein a radius of the half-circular profile decreases as the ridges extend toward the bottom wall of the housing.

8. The flow-directing water filter system of claim 1, wherein the helical ridges each extend around approximately one-quarter of a circumference of the substantially cylindrical void.

9. The flow-directing water filter system of claim 1, wherein a vertical extension of the plurality of water-directing ridges is between 80 and 100 percent of a length of the cartridge.

10. A water filtration system, comprising:
a head having at least one inlet for receiving input water and at least one outlet for providing filtered output water;
a cylindrical water filter cartridge having a central void for providing the filtered output water and an outer surface for receiving the input water;
a water filter housing comprising a housing body having an inner wall defining a substantially cylindrical void for receiving the water filter cartridge with a longitudinal axis of the water filter cartridge aligned with a central axis of the substantially cylindrical void, a bottom wall supporting a bottom end of the water filter cartridge, and mounting features disposed at a top end of the water filter housing for mating with corresponding mating features of the head; and
a plurality of water-directing ridges that form channels between adjacent ones of the water-directing ridges and between the inner wall of the housing and an outer surface of the water filter cartridge for directing laminar flow of water along the outer surface of the water filter cartridge to improve distribution of water flow through the water filter cartridge along the length of the water filter cartridge, wherein a cross-sectional profile of the ridges decrease in area as the water-directing ridges extend around the inner wall of the housing body toward the bottom wall of the housing body, so that a length of a gap between the outer surface of the water filter cartridge and the plurality of water-directing ridges increases as the water-directing ridges extend around the inner wall of the housing body toward the bottom wall of the housing body.

11. The water filtration system of claim 10, wherein the plurality of water-directing ridges are formed on the inner wall of the housing.

12. The water filtration system of claim 10, further comprising a top disc inserted into the housing body above a top end of the water filter cartridge, wherein the top disc defines a central void for providing clearance for an outlet water fitting of the water filter cartridge that passes through the void to connect to an outlet water fitting of the water filter system head and for passing inlet water uniformly around the outlet water fitting of the water filter cartridge, wherein the top disc includes a plurality of posts for maintaining a distance between the top disc and a top of the water filter cartridge to pass the inlet water to the outside surface of the water filter cartridge, wherein the plurality of posts are aligned with top ends of corresponding ones of the ridges around the central axis of the substantially cylindrical void.

13. The flow-directing water filter housing of claim 10, wherein a cross-sectional profile of the plurality of water-directing ridges extending in plane normal to the longitudinal axis of the water filter cartridge is half-circular and wherein a radius of the half-circular profile decreases as the ridges extend toward the bottom wall of the housing.

14. A method of filtering water, comprising:
receiving inlet water from an inlet of a water filtration system head;
inserting a filter cartridge into a water filter housing, the water filter housing comprising a housing body having an inner wall defining a substantially cylindrical void for receiving the water filter cartridge with a longitudinal axis of the water filter cartridge aligned with a central axis of the substantially cylindrical void, a bottom wall supporting a bottom end of the water filter cartridge, and mounting features disposed at a top end of the water filter housing for mating with corresponding mating features of the head;
retaining the water filter housing to the head so that the inlet water is provided to an outer surface of the water filter cartridge;
directing laminar flow of the inlet water around and downward around and along an outer surface of the water filter cartridge in channels formed between the inner wall of the housing and the outer surface of the water filter cartridge with a plurality of helical water-directing ridges formed on the inner wall of the housing to improve distribution of water flow through the water filter cartridge along the length of the water filter cartridge and to circulate the inlet water around the water filter cartridge to increase the effective surface area of the outer surface of the water filter cartridge.

15. The method of claim 14, further comprising inserting a top disc into the housing body above a top end of the water filter cartridge, wherein the top disc defines a central void to provide clearance for an outlet water fitting of the water filter cartridge that passes through the void to connect to an outlet water fitting of the water filter system head and for passing inlet water uniformly around the outlet water fitting of the water filter cartridge, wherein the top disc includes a plurality of posts for maintaining a distance between the top disc and a top of the water filter cartridge to pass the inlet water to the outside surface of the water filter cartridge, wherein the plurality of posts are aligned with top ends of corresponding ones of the ridges around the central axis of the substantially cylindrical void.

16. The method of claim 14, wherein a cross-sectional profile of the plurality of water-directing ridges extending in plane normal to the longitudinal axis of the water filter cartridge is half-circular and wherein a radius of the half-circular profile decreases as the ridges extend toward the bottom wall of the housing, and wherein a gap between the outer surface of the water filter cartridge and the plurality of water-directing ridges increases as the water-directing ridges extend around and downward along the inner wall of the housing body toward a bottom wall of the housing body.

\* \* \* \* \*